（12）United States Patent
Prushinskiy et al.

US011895383B2

(10) Patent No.: US 11,895,383 B2
(45) Date of Patent: Feb. 6, 2024

(54) ELECTRONIC DEVICE INCLUDING OPTICAL SENSOR

(71) Applicant: Samsung Electronics Co., Ltd., Suwon-si (KR)

(72) Inventors: Valeriy Prushinskiy, Suwon-si (KR); Changryong Heo, Suwon-si (KR); Hyungsok Yeo, Suwon-si (KR); Minwoo Yoo, Suwon-si (KR); Seonho Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 17/583,701

(22) Filed: Jan. 25, 2022

(65) Prior Publication Data

US 2022/0239807 A1    Jul. 28, 2022

Related U.S. Application Data

(63) Continuation of application No. PCT/KR2022/000412, filed on Jan. 11, 2022.

(30) Foreign Application Priority Data

Jan. 27, 2021    (KR) .................. 10-2021-0011338

(51) Int. Cl.
*H04N 23/54* (2023.01)
*G06F 1/16* (2006.01)
*G01S 17/08* (2006.01)
*H04N 23/51* (2023.01)
*H04N 23/695* (2023.01)

(52) U.S. Cl.
CPC .............. *H04N 23/54* (2023.01); *G01S 17/08* (2013.01); *G06F 1/1652* (2013.01); *H04N 23/51* (2023.01); *H04N 23/695* (2023.01)

(58) Field of Classification Search
CPC ...... H04N 23/54; H04N 23/51; H04N 23/695; H04N 23/57; G01S 17/08; G01S 7/4813; G06F 1/1652; G06F 1/1686; G06F 1/1626
(Continued)

(56) References Cited

U.S. PATENT DOCUMENTS 10,019,940 B2    7/2018    Rappoport et al.
11,404,676 B2 *  8/2022    Li .................... H04M 1/0266
(Continued)

FOREIGN PATENT DOCUMENTS

CN    110505404 A    11/2019
CN    209845029 U    12/2019
(Continued)

OTHER PUBLICATIONS

International Search Report with Written Opinion dated Apr. 15, 2022 issued in International Patent Application No. PCT/KR2022/000412.

*Primary Examiner* — Albert H Cutler
(74) *Attorney, Agent, or Firm* — Jefferson IP Law, LLP

(57) ABSTRACT

An electronic device is provided. The electronic device includes a housing, a stretchable display disposed so as to be visible from the outside in at least a part of the housing to face a first direction, a module housing which is rotatably arranged in a first space and includes a second space as an optical sensor assembly disposed in the first space of the housing, and an optical sensor assembly including at least one first optical sensor disposed in the second space of the module housing and configured to detect an external environment through at least a portion of the module housing, wherein in a first rotational state, the module housing is positioned such that the at least one first optical sensor detects an external environment in a second direction different from the first direction, and in a second rotational (Continued)

state, the module housing is positioned such that the at least one first optical sensor detects the external environment in the first direction through an extended area of the stretchable display, which is expanded through pressing of at least a portion of the module housing.

20 Claims, 16 Drawing Sheets

(58) Field of Classification Search
USPC .................................. 455/556.1, 556.2, 557
See application file for complete search history.

(56) References Cited

U.S. PATENT DOCUMENTS

| | | | | |
|---|---|---|---|---|
| 2012/0169850 A1* | 7/2012 | Kim | ..................... | H04N 13/144 |
| | | | | 348/51 |
| 2013/0044240 A1* | 2/2013 | Leskela | .................. | H04N 23/54 |
| | | | | 348/239 |
| 2019/0064875 A1 | 2/2019 | Ahn et al. | | |
| 2020/0076992 A1* | 3/2020 | Wu | ...................... | H04M 1/0264 |
| 2020/0329130 A1 | 10/2020 | Choi et al. | | |
| 2021/0358969 A1* | 11/2021 | Wang | ....................... | G09G 3/20 |
| 2021/0376267 A1* | 12/2021 | Zhang | .................. | G06F 1/1626 |
| 2021/0409529 A1* | 12/2021 | Yu | ......................... | G06F 1/1626 |
| 2023/0101133 A1* | 3/2023 | Choi | ..................... | G06F 1/1641 |
| | | | | 361/749 |
| 2023/0103098 A1* | 3/2023 | Nakata | ................... | H04N 23/58 |
| | | | | 348/36 |

FOREIGN PATENT DOCUMENTS

| | | |
|---|---|---|
| CN | 111462637 A | 7/2020 |
| KR | 10-2019-0023008 A | 3/2019 |
| KR | 10-2020-0118997 A | 10/2020 |
| KR | 10-2020-0126735 A | 11/2020 |

* cited by examiner

ELECTRONIC DEVICE INCLUDING OPTICAL SENSOR

CROSS-REFERENCE TO RELATED APPLICATION(S)

This application is a continuation application, claiming priority under § 365(c), of an International application No. PCT/KR2022/000412, filed on Jan. 11, 2022, which is based on and claims the benefit of a Korean patent application number 10-2021-0011338, filed on Jan. 27, 2021, in the Korean Intellectual Property Office, the disclosure of which is incorporated by reference herein in its entirety.

TECHNICAL FIELD

The disclosure relates to an electronic device including an optical sensor.

BACKGROUND ART

An electronic device, for example, a portable electronic device, is released in various sizes according to its functions and user preferences, and it may include a large-screen display for securing wide visibility and ease of operation. The electronic device may include at least one optical sensor disposed around the display in the inner space. The electronic device may include an improved arrangement structure for at least one optical sensor in order to detect an external environment through the display without impairing an inherent function (e.g., a display function) of the display.

The above information is presented as background information only to assist with an understanding of the disclosure. No determination has been made, and no assertion is made, as to whether any of the above might be applicable as prior art with regard to the disclosure.

DISCLOSURE

Technical Problem

The electronic device may include a display arranged to be viewed from the outside through at least a portion of the housing. Such a display may include a flexible display for responding to various structural modifications of the housing. The flexible display can be configured to be bendable or rollable by placing wires and pixels through a substrate made of a dielectric material. A recent flexible display may include a stretchable display that is deformable in two or more directions by arranging pixels through a substrate made of an elastomer material and a deformable wiring structure applied thereto. Such a stretchable display may have the advantage of being able to respond flexibly to the shape of the electronic device being deformed into various shapes.

Meanwhile, the electronic device may include at least one optical sensor (e.g., a camera device, a distance detection sensor, or a proximity sensor) disposed under a display in an inner space to detect an external environment. When at least one optical sensor is arranged to detect an external environment through at least a part of the display (e.g., under display camera (UDC) structure), in the corresponding area of the display overlapping the optical sensor, either or both the pixel density or wiring density may be set lower than that of the peripheral area in order to meet the transmittance required by the optical sensor. However, in the area of the display corresponding to the optical sensor, a phenomenon that is visually recognized from the outside occurs because of pixels arranged at a low density, thereby reducing the reliability of the device and providing discomfort to the user. In addition, when a stretchable display is used as a display, a corresponding region of the stretchable display overlapping the optical sensor may be set to contract the stretchable display through a separate link structure so that the optical sensor is exposed to the outside. However, such a configuration requires the use of a complex link structure for contracting a designated area of the stretchable display, and it may cause an imbalance in the display area due to the contracted area of the display, thereby providing discomfort to the user.

Aspects of the disclosure are to address at least the above-mentioned problems and/or disadvantages and to provide at least the advantages described below. Accordingly, an aspect of the disclosure is to provide an electronic device including an optical sensor.

Another aspect of the disclosure is to provide an electronic device including an optical sensor capable of smoothly detecting an external environment while maintaining an intrinsic function of a display.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing, a stretchable display disposed so as to be visible from the outside in at least a part of the housing to face a first direction, a module housing which is rotatably arranged in a first space and includes a second space as an optical sensor assembly disposed in the first space of the housing, and an optical sensor assembly including at least one first optical sensor disposed in the second space of the module housing and configured to detect an external environment through at least a portion of the module housing, wherein in a first rotational state, the module housing is positioned such that at least one first optical sensor detects an external environment in a second direction different from the first direction, and in a second rotational state, the module housing is positioned such that the at least one first optical sensor detects the external environment in the first direction through an extended area of the stretchable display, which is expanded through pressing of at least a portion of the module housing.

In accordance with another aspect of the disclosure, an electronic device is provided. The electronic device includes a housing, a stretchable display arranged to be visible from the outside at part of the housing, a rotating structure rotatably disposed in the inner space of the housing, and at least one optical sensor disposed in the inner space, wherein the stretchable display, in a first rotational state of the rotational structure, has an expanded area deformed by pressing the rotational structure, and the at least one optical sensor is arranged to detect an external environment through an extended area of the stretchable display.

Advantageous Effects

An electronic device according to various embodiments of the disclosure, by providing an optical sensor arrangement structure capable of detecting an external environment without performance degradation by using a deformable characteristic while maintaining an intrinsic function of a stretchable display, may help to improve the reliability of the electronic device.

In addition, various effects identified directly or indirectly through this document may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces FIG. 1 illustrates an example electronic device in a network environment according to an embodiment of the disclosure.

Figure 1:
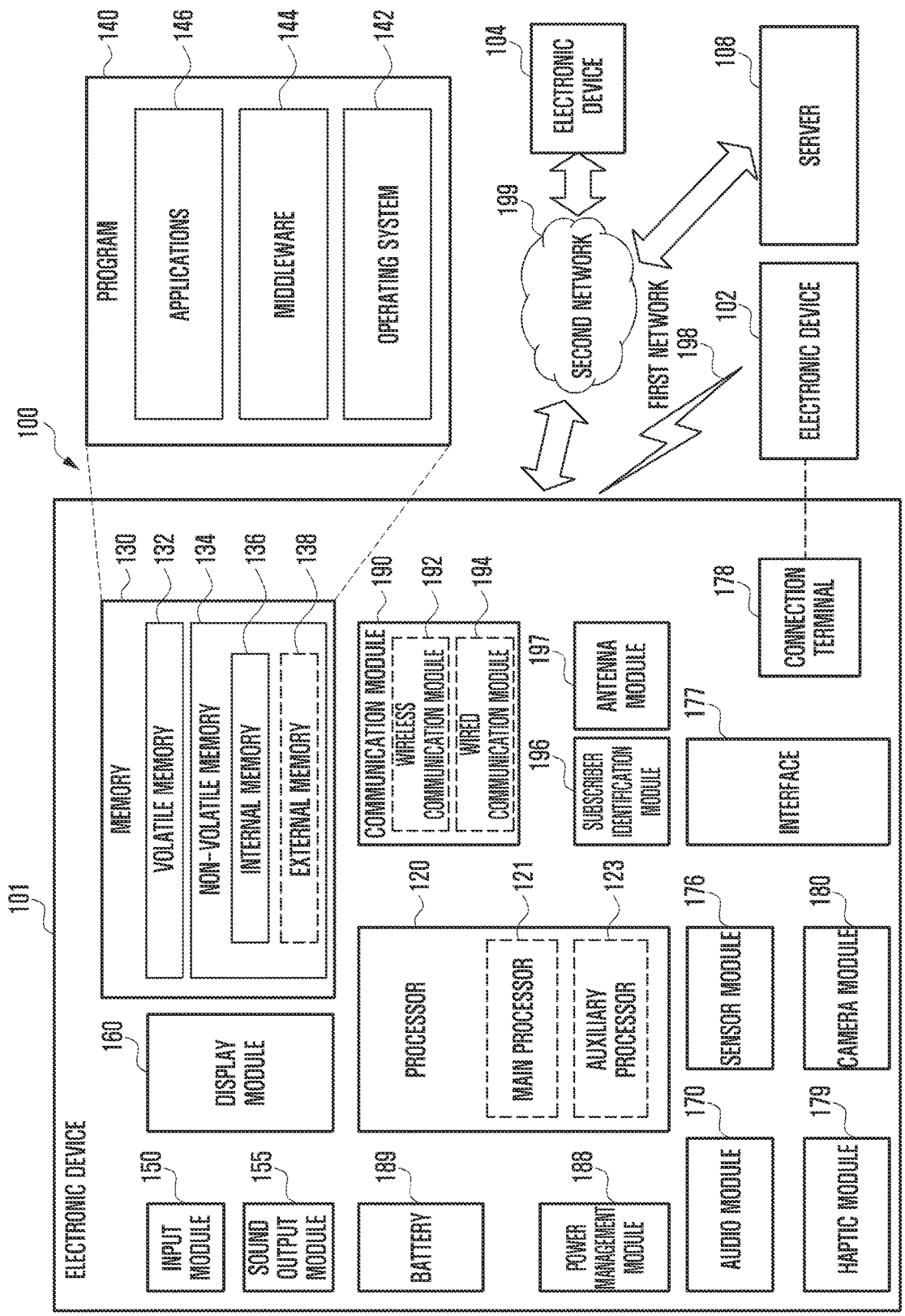
FIG. 1 is a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming call. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 and 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
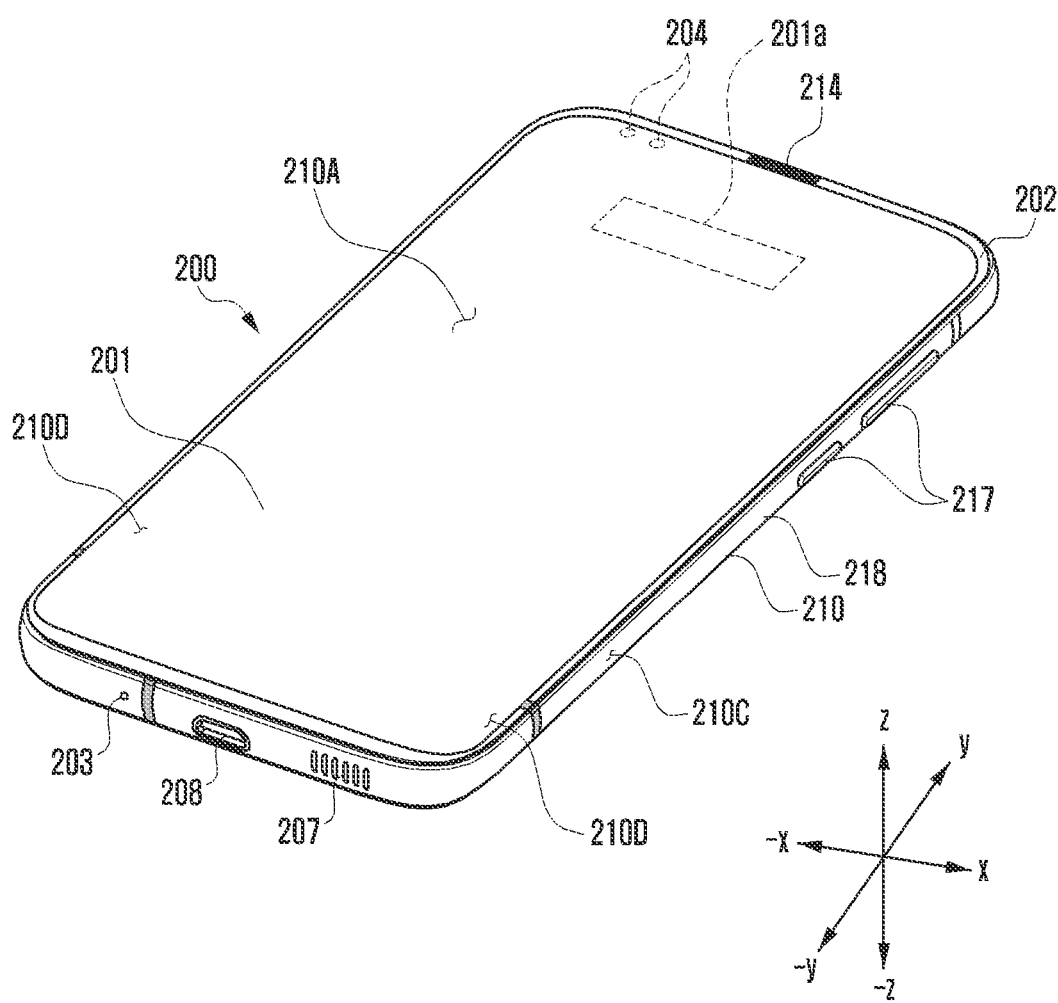
FIG. 2A is a perspective view of an electronic device according to an embodiment of the disclosure.

FIG. 2A illustrates a perspective view showing a front surface of a mobile electronic device according to an embodiment of the disclosure.

Figure 2B:
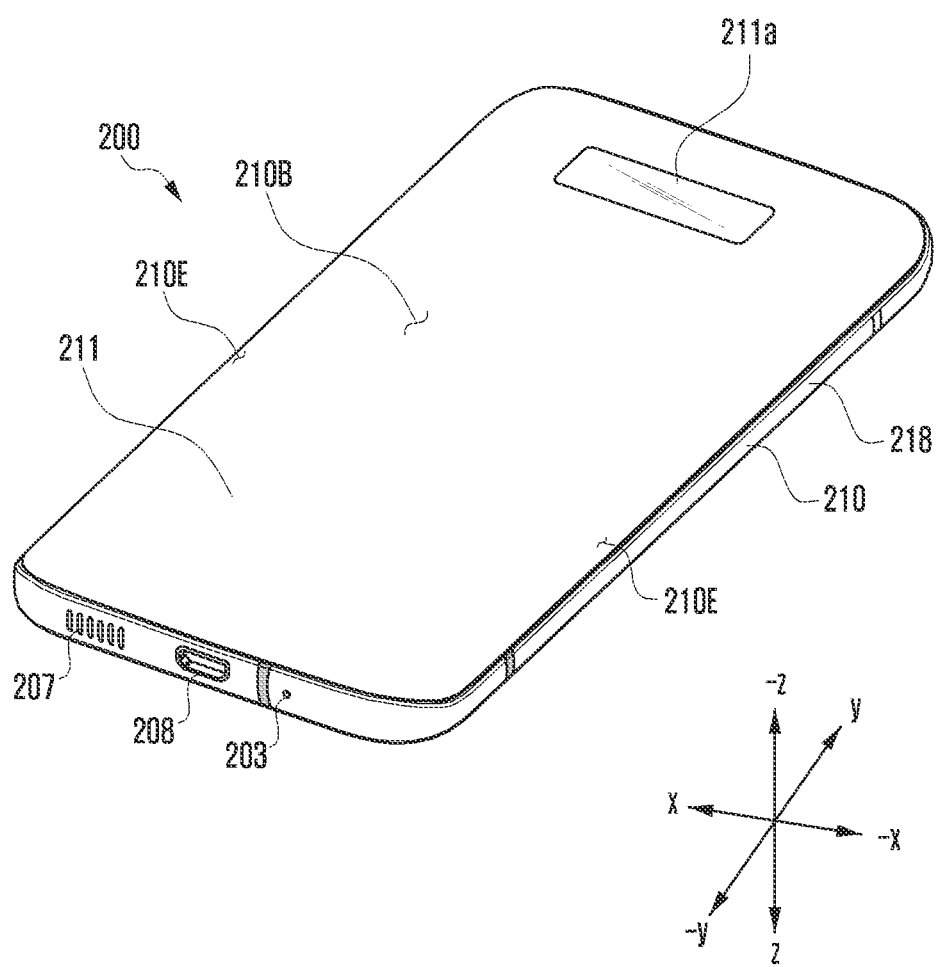
FIG. 2B is a rear perspective view of an electronic device according to an embodiment of the disclosure.

FIG. 2B illustrates a perspective view showing a rear surface of a mobile electronic device shown in FIG. 2A according to an embodiment of the disclosure.

The electronic device 200 in FIGS. 2A and 2B may be at least partially similar to the electronic device 101 in FIG. 1 or may further include other embodiments.

Referring to FIGS. 2A and 2B, the mobile electronic device 200 may include a housing 210 that includes a first surface (or front surface) 210A, a second surface (or rear surface) 210B, and a lateral surface 210C that surrounds a space between the first surface 210A and the second surface 210B. The housing 210 may refer to a structure that forms a part of the first surface 210A, the second surface 210B, and the lateral surface 210C. The first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may be formed of, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

The front plate 202 may include two first regions 210D disposed at long edges thereof, respectively, and bent and extended seamlessly from the first surface 210A toward the rear plate 211. Similarly, the rear plate 211 may include two second regions 210E disposed at long edges thereof, respectively, and bent and extended seamlessly from the second surface 210B toward the front plate 202. The front plate 202

(or the rear plate 211) may include only one of the first regions 210D (or of the second regions 210E). The first regions 210D or the second regions 210E may be omitted in part. When viewed from a lateral side of the mobile electronic device 200, the lateral bezel structure 218 may have a first thickness (or width) on a lateral side where the first region 210D or the second region 210E is not included, and may have a second thickness, being less than the first thickness, on another lateral side where the first region 210D or the second region 210E is included.

Figure 4:
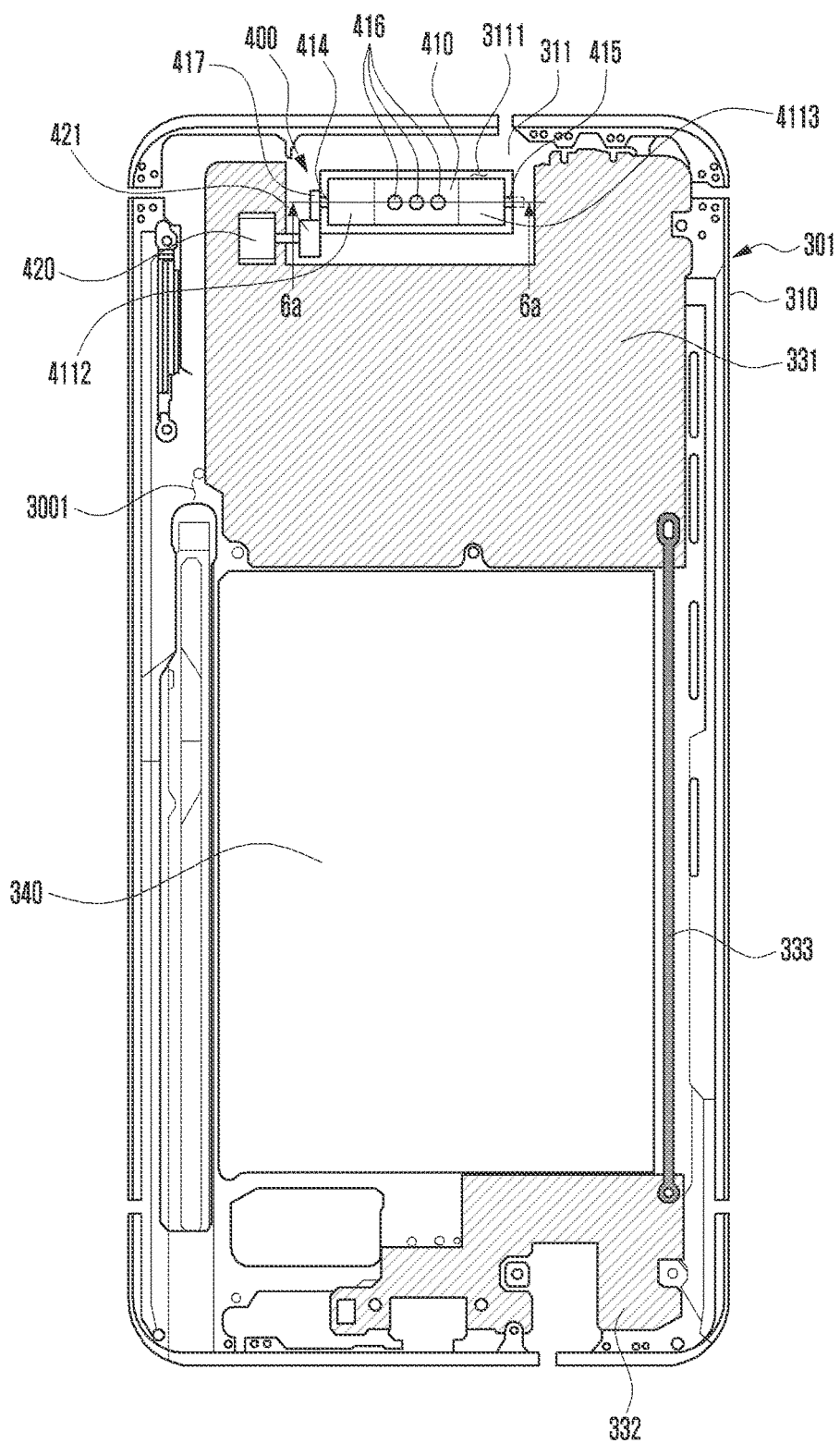
FIG. 4 is a view illustrating an internal configuration of an electronic device in a state in which a rear cover is removed according to an embodiment of the disclosure.

The mobile electronic device 200 may include at least one of a display 201, input device 203, audio modules 207 and 214, sensor modules 204, camera module (e.g., optical sensor (i.e., the camera module 416) of FIG. 4), the key input device 217, a light emitting device(not shown), and connector hole 208. The mobile electronic device 200 may omit at least one (e.g., the key input device 217 or the light emitting device) of the above components, or may further include other components.

The display 201 may be exposed through a substantial portion of the front plate 202, for example. At least a part of the display 201 may be exposed through the front plate 202 that forms the first surface 210A and the first region 210D of the lateral surface 210C. The display 201 may be combined with, or adjacent to, a touch sensing circuit, a pressure sensor capable of measuring the touch strength (pressure), and/or a digitizer for detecting a stylus pen. At least a part of the sensor modules 204 and 219 and/or at least a part of the key input device 217 may be disposed in the first region 210D and/or the second region 210E. The display 201 may include a stretchable display configured to be deformable in two or more directions at least partially by external pressure. In this case, the front plate 202 may be omitted or replaced with a window layer (e.g., a polymer layer) that is deformably laminated on the outer surface of the stretchable display.

According to certain embodiments, the input device 203 2ay include at least one microphone. In certain embodiments, the input device 203 may include a plurality of microphones disposed to detect the direction of a sound. According to an embodiment, the sound output devices 207 and 214 may include speakers. According to an embodiment, the input device 203 may include a receiver for calls disposed in the first housing 210, and a speaker. In certain embodiments, the input device 203, the sound output devices 207 and 214, and the connector hole 208 may be disposed in a space arranged in the first housing 210 and/or the second housing 220 of the electronic device 200, and may be exposed to the external environment through at least one hole formed in the first housing 210 and/or the second housing 220. In certain embodiments, the sound output devices 207 and 214 may include a speaker (e.g., piezo speaker) that operates without using a hole formed in the first housing 210 and/or the second housing 220.

The sensor modules 204 and 219 may generate electrical signals or data corresponding to an internal operating state of the mobile electronic device 200 or to an external environmental condition. The sensor modules 204 and 219 may include a first sensor module 204 (e.g., a proximity sensor) and/or a second sensor module (e.g., a fingerprint sensor) disposed on the first surface 210A of the housing 210, and/or a third sensor module 219 (e.g., a heart rate monitor (HRM) sensor) and/or a fourth sensor module (e.g., a fingerprint sensor) disposed on the second surface 210B of the housing 210. The fingerprint sensor may be disposed on the second surface 210B as well as the first surface 210A (e.g., the display 201) of the housing 210. The electronic device 200 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The key input device 217 may be disposed on the lateral surface 210C of the housing 210. The mobile electronic device 200 may not include some or all of the key input device 217 described above, and the key input device 217 which is not included may be implemented in another form such as a soft key on the display 201. The key input device 217 may include the sensor module disposed on the second surface 210B of the housing 210.

The light emitting device may be disposed on the first surface 210A of the housing 210. For example, the light emitting device may provide status information of the electronic device 200 in an optical form. The light emitting device may provide a light source associated with the operation of the camera module (i.e., sensor module) 204. The light emitting device may include, for example, a light emitting diode (LED), an IR LED, or a xenon lamp.

The connector holes 208 and 203 may include a first connector hole 208 adapted for a connector (e.g., a USB connector) for transmitting and receiving power and/or data to and from an external electronic device, and/or a second connector hole 203 adapted for a connector (e.g., an earphone jack) for transmitting and receiving an audio signal to and from an external electronic device.

According to various embodiments, the electronic device 200 may include at least one camera module (e.g., the camera module 416 of FIG. 4) disposed in an inner space as at least one optical sensor. According to an embodiment, at least one camera module (e.g., camera module 416 in FIG. 4) may include one or a plurality of lenses (wide-angle and telephoto lenses), an image sensor, and an image signal processor. According to an embodiment, the at least one camera module (e.g., the camera module 416 of FIG. 4) may be rotatably arranged in the inner space of the electronic device 200 through the module housing (e.g., the module housing 410 of FIG. 4). For example, at least one camera module (e.g., the camera module 416 of FIG. 4) may be disposed to face the rear surface (i.e., second surface 210B) in the first rotation state as an initial state. In this case, the electronic device 200 may be set to photograph the subject located in the direction (e.g., the −z-axis direction of FIG. 2B) toward the rear surface (i.e., second surface 210B) through at least one camera module (e.g., the camera module 416 of FIG. 4). According to one embodiment, at least one camera module (e.g., the camera module 416 of FIG. 4) may be arranged to photograph an external subject through the window 211a disposed on at least a portion of the rear plate 211. In some embodiments, the window 211a may be replaced with a rear plate 211 formed of a transparent material. According to an embodiment, at least one camera module (e.g., the camera module 416 of FIG. 4) may be rotated to face the front surface (i.e., second surface 210A) in the second rotation state. In this case, the electronic device 200 may be set to photograph a subject located in the direction (e.g., the z-axis direction) of the front surface (i.e., first surface 210A) through at least one camera module (e.g., the camera module 416 of FIG. 4). According to an embodiment, at least one camera module (e.g., the camera module 416 of FIG. 4) may be arranged to photograph an external subject through at least a partial area 201a of the display 201. In some embodiments, the processor (e.g., the processor 120 of FIG. 1) of the electronic device 200 controls the rotation of the module housing (e.g., the module housing 410 of FIG. 4) through at least one camera module (e.g., the camera module 416 of FIG. 4) and, in the initial state, it may be set to photograph the subject located in the direction in which the front surface (i.e., second surface 210A) faces; and, in a state in which the module housing (e.g., the module housing 410 of FIG. 4) is rotated in the opposite direction from the initial state, it may be set to photograph a subject located in the direction the rear surface (i.e., second surface 210B) faces.

According to various embodiments, the electronic device 200 may include a stretchable display 201 as the display 201. According to one embodiment, in the second rotation state, a partial region of the stretchable display 201 may contain an extended area deformed to protrude from the peripheral area by being pressed through the module housing (e.g., the module housing 410 of FIG. 4). According to an embodiment, the extended area is modified to have a relatively higher transmittance than the peripheral area, for example, by changing the arrangement density of pixels, so that it may satisfy the subject photographing condition for at least one camera module (e.g., the camera module 416 of FIG. 4) disposed below it.

Hereinafter, as at least one optical sensor, an arrangement structure of at least one camera module (e.g., the camera module 416 of FIG. 4) will be described in detail.

Figure 3:
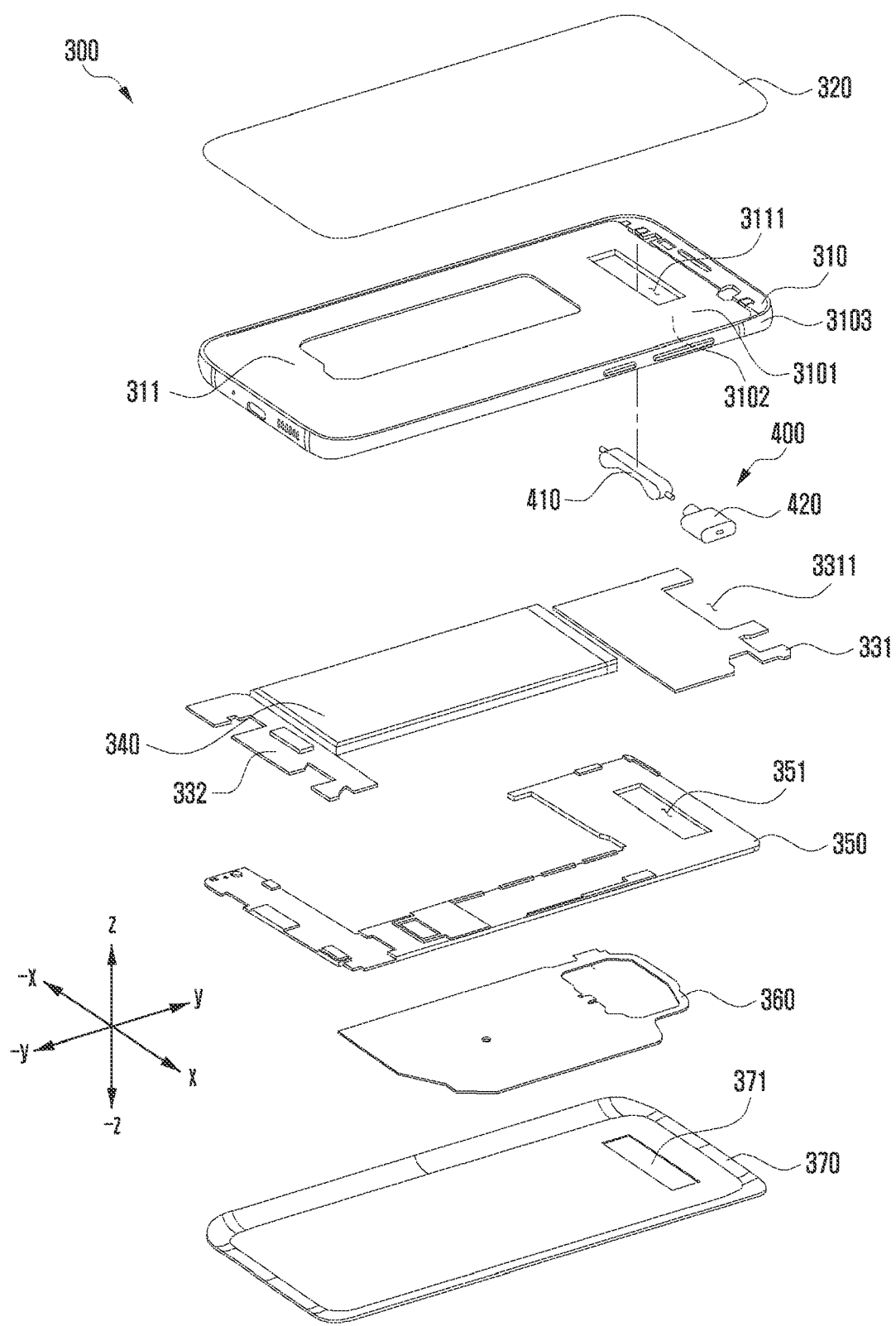
FIG. 3 is an exploded perspective view of an electronic device according to an embodiment of the disclosure.

FIG. 3 is an exploded perspective view of an electronic device according to an embodiment of the disclosure.

An electronic device 300 of FIG. 3 may be at least partially similar to the electronic device 101 of FIG. 1 or the electronic device 200 of FIGS. 2A and 2B, or it may include another embodiment of the electronic device.

Referring to FIG. 3, the electronic device 300 (e.g., the electronic device 200 of FIG. 2A) may include a side member 310 (e.g. side bezel structure or a front case), a support member 311 (e.g., a bracket or support structure), a stretchable display 320 (e.g., the display 201 in FIG. 2A), at least one circuit board 331, 332 (e.g., PCB, printed circuit board), a battery 340, an additional support member 350 (e.g., a rear case), an antenna 360, a rear cover 370 (e.g., the rear plate 211 in FIG. 2B) (e.g., a cover member), and, as at least one optical sensor disposed in the inner space of the electronic device 300 (e.g., the inner space 3001 of FIG. 4) and selectively detecting an external environment through the stretchable display 320, an optical sensor assembly 400 including at least one camera module (e.g., at least one camera module 416 of FIG. 4). In some embodiments, the stretchable display 320 may further include a protective layer (e.g., a window layer) that is laminated on the upper surface of the display panel and is at least partially elastically deformable. In some embodiments, the electronic device 300 may omit at least one of the components (e.g., the support member 311 or the additional support member 350) or additionally include other components. At least one of the components of the electronic device 300 may be the same as or similar to at least one of the components of the electronic device 200 of FIGS. 2A and 2B, and overlapping descriptions may be omitted.

According to various embodiments, the side member 310 may include a first surface 3101 facing the first direction (e.g., the z-axis direction), a second surface 3102 facing the direction opposite to the first surface 3101, and a side surface 3103 surrounding the space between the first surface 3101 and the second surface 3102 (e.g., the inner space 3001 in FIG. 4). According to an embodiment, at least a portion of the side surface 3103 may form an exterior of the electronic device. According to an embodiment, the support member 311 may be disposed in such a way that it extends from the side member 310 toward the inner space 3001 of the electronic device 300. In some embodiments, the support member 311 may be disposed separately from the side member 310. According to one embodiment, the side member 310 and the support member 311 may be formed of, for example, either or both a metal material or a non-metal material (e.g., a polymer). According to an embodiment, the support member 311 may support at least a portion of the stretchable display 320 through the first surface 3101, and it may be arranged to support either or both at least one of the circuit board 331, 332 or at least a portion of the battery 340 through the second surface 3102. According to one embodiment, at least one circuit board 331, 332 may include a first circuit board 331 (e.g., a main substrate) disposed on one side with respect to the battery 340 in the inner space 3001 of the electronic device 300 and a second circuit board 332 (e.g., a sub circuit board) disposed on the other side. According to an embodiment, the first circuit board 331 and the second circuit board 332 may include a processor, a memory, and an interface. According to an embodiment, the processor may include, for example, one or more of a central processing unit, an application processor, a graphics processing unit, an image signal processor, a sensor hub processor, or a communication processor. According to one embodiment, the memory may include, for example, volatile memory or non-volatile memory. According to an embodiment, the interface may include, for example, a high definition multimedia interface (HDMI), a universal serial bus (USB) interface, an SD card interface, and an audio interface. The interface may, for example, electrically or physically connect the electronic device 300 to an external electronic device, and it may include a USB connector, an SD card/multimedia card (MMC) connector, or an audio connector. According to one embodiment, as the battery 340 is a device for supplying power to at least one component of the electronic device 300, for example, it may include a non-rechargeable primary cell, or a rechargeable secondary cell, or a fuel cell. At least a portion of the battery 340 may be disposed substantially on the same plane as, for example, at least one of the circuit boards 331 and 332. The battery 340 may be disposed in such a way that it is embedded in the electronic device 300. In some embodiments, the battery 340 may be detachably disposed from the electronic device 300.

According to various embodiments, the antenna 360 may be disposed between the rear cover 370 and the battery 340. The antenna 360 may include, for example, a near field communication (NFC) antenna, a wireless charging antenna, and a magnetic secure transmission (MST) antenna. The antenna 360 may, for example, perform short-range communication with an external device or wirelessly transmit and receive power required for charging. In some embodiments, the antenna structure may be formed by some or a combination of the side member 310 and the support member 311. In some embodiments, the electronic device 300 may further include a digitizer for detecting an external electronic pen.

According to various embodiments, the optical sensor assembly 400 may include a module housing 410 including at least one camera module (e.g., the at least one camera module 416 of FIG. 4) therein that is rotatably disposed in the inner space of the electronic device 300 (e.g., the inner space 3001 of FIG. 4), and a drive module 420 (e.g., a drive motor) for rotating the module housing 410 to a specified angle. According to one embodiment, the optical sensor assembly 400 includes a plurality of lenses (e.g., a lens group) disposed in the inner space of the module housing 410 (the inner space 4101 of FIG. 5A) and either or both at least one image sensor or sensor IC aligned with a plurality of lenses. According to an embodiment, the optical sensor assembly may be electrically connected to either or both the processor (e.g., the processor 120 of FIG. 1) of the first circuit board 331 or the second circuit board 332 through an electrical connection member (e.g., FPCB). According to one embodiment, the driving module 420 may be coupled to a part of the module housing 410. For example, the driving module 420 may include at least one driving motor disposed to interlock with the module housing 410 through at least one of a gear assembly, a link assembly, a reduction module, and a belt assembly. According to an embodiment, the module housing 410 may be rotatably disposed in such a way that it penetrates through the opening 3111 formed in the support member 311. According to an embodiment, the module housing 410 may be installed to press at least a partial region of the stretchable display 320 disposed to receive the support of the first surface 3101 according to the rotational position.

According to various embodiments, at least one camera module (e.g., at least one camera module 416 of FIG. 4) may be arranged to detect an external environment through at least a portion of the module housing 410. According to one embodiment, when the module housing 410 is changed to the first rotation state by the driving module 420, at least one camera module (e.g., at least one camera module 416 in FIG. 4) is disposed to face the rear cover 370, and it may be set to detect the external environment through an open structure 3311 formed in the first circuit board 331, an opening 351 formed in the additional support member 350, and a window 371 formed in the rear cover 370. According to one embodiment, when the module housing 410 transitions from the first rotation state to the second rotation state through the driving module 420, by pressing the module housing 410 the corresponding area of the stretchable display 320 may be transformed into an extended area that protrudes from the peripheral area. According to an embodiment, the extended area of the stretchable display 320 may be self-modified to have transmittance higher than the peripheral area, which satisfies an allowable transmittance for at least one camera module (e.g., at least one camera module 416 of FIG. 4). In this case, at least one camera module (e.g., at least one camera module 416 of FIG. 4) may be set to detect an external environment through the extended area of the stretchable display 320.

FIG. 4 is a view illustrating an internal configuration of an electronic device in a state in which the rear cover is removed according to an embodiment of the disclosure.

Referring to FIG. 4, the electronic device 300 may include a housing 301 including a side member 310 and a support member 311 extending from the side member 310 into the inner space 3001 (e.g., the housing 210 in FIG. 2A), a first circuit board 331 that is disposed to be at least partially supported by the support member 311, a second circuit board 332 spaced apart from the first circuit board 331, a battery 340 disposed between the first circuit board 331 and the second circuit board 332, and an optical sensor assembly 400 disposed in the inner space 3001 and including at least one camera module 416. According to an embodiment, the battery 340 may be disposed so as not to overlap either or both the first circuit board 331 or the second circuit board 332. In another embodiment, the battery 340 may be disposed to at least partially overlap either or both the first circuit board 331 or the second circuit board 332. According to an embodiment, the first circuit board 331 may be electrically connected to the second circuit board 332 through an electrical connection member 333. According to an embodiment, the electrical connection member 333 may include a radio frequency (RF) coaxial cable or a flexible printed circuit board (FPCB) type RF cable (FRC).

According to various embodiments, the optical sensor assembly 400 may include a module housing 410 that is rotatably disposed through the opening 3111 of the support member 311 and a drive module 420 arranged to rotate the module housing 410 near the module housing 410. According to one embodiment, the opening 3111 of the support member 311 may be replaced with an open structure in which a part is opened. According to an embodiment, the module housing 410 may receive a driving force from the driving module 420 through a gear combination. For example, the module housing 410 may be provided with a driving force by the pinion gear 421 of the driving module 420 (e.g., a driving motor) being meshed with the pinion gear 417 disposed on one side of the module housing 410. According to an embodiment, the driving module 420 may receive control (servo control) through the processor of the electronic device 300 (e.g., the processor 120 of FIG. 1). For example, by the driving force of the driving module 420 through the control of the processor (e.g., the processor 120 of FIG. 1), the amount of rotation of the module housing 410 may be controlled to position the module housing 410 in a designated direction (e.g., −z-axis direction in FIG. 3) in which at least one camera module 416 faces the rear cover (e.g., the rear cover 370 in FIG. 3) and to face a designated direction (e.g., the z-axis direction of FIG. 3) facing the stretchable display (e.g., the stretchable display 320 of FIG. 3). In some embodiments, the rotation amount of the module housing 410 may be controlled through a structural coupling (detent structure) with a surrounding structure (e.g., the support member 311).

In some embodiments, either or both the module housing 410 or the driving module 420 may be disposed in the inner space 3001 of the electronic device 300 without passing through the support member 311. In some embodiments, the at least one camera module 416 may be replaced with at least one of a distance detection sensor (e.g., a time of flight (TOF) sensor or a light detection and ranging (LiDAR) scanner), an infrared sensor, an ultrasonic sensor, a proximity sensor, an illuminance sensor, or an iris sensor that is disposed in the module housing 410 to detect the external environment.

Figure 5A:
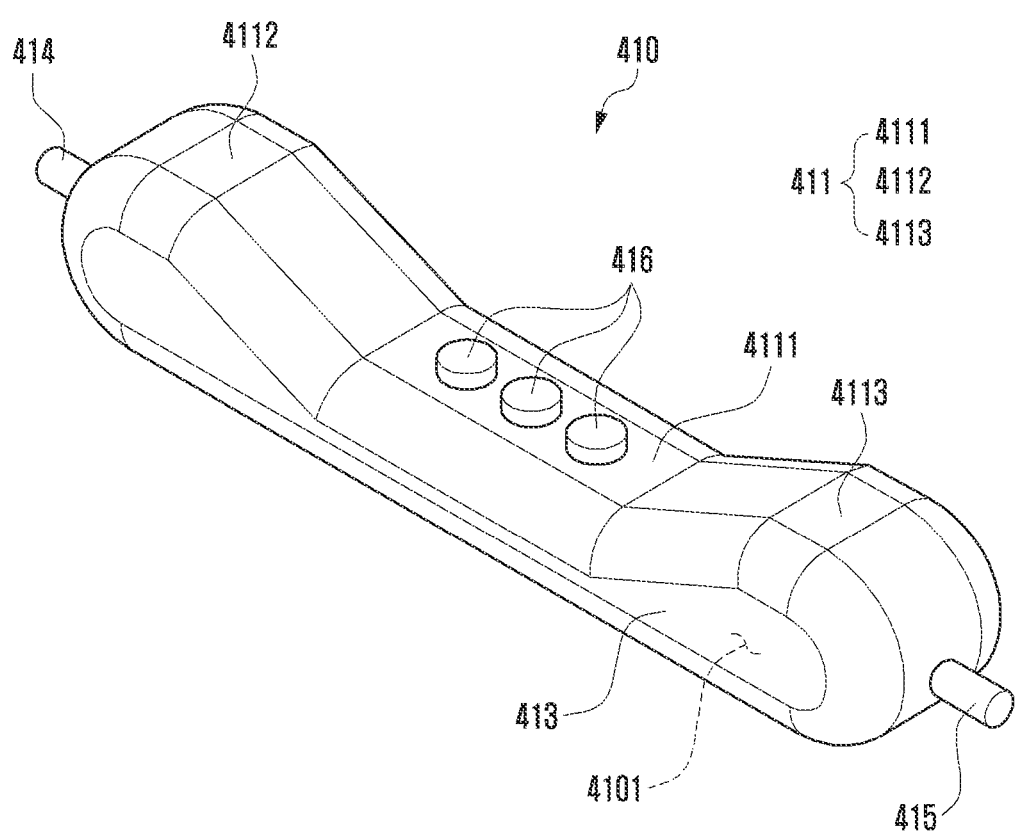
FIG. 5A is a perspective view of a module housing according to an embodiment of the disclosure.

FIG. 5A is a perspective view of a module housing according to an embodiment of the disclosure.

Figure 5B:
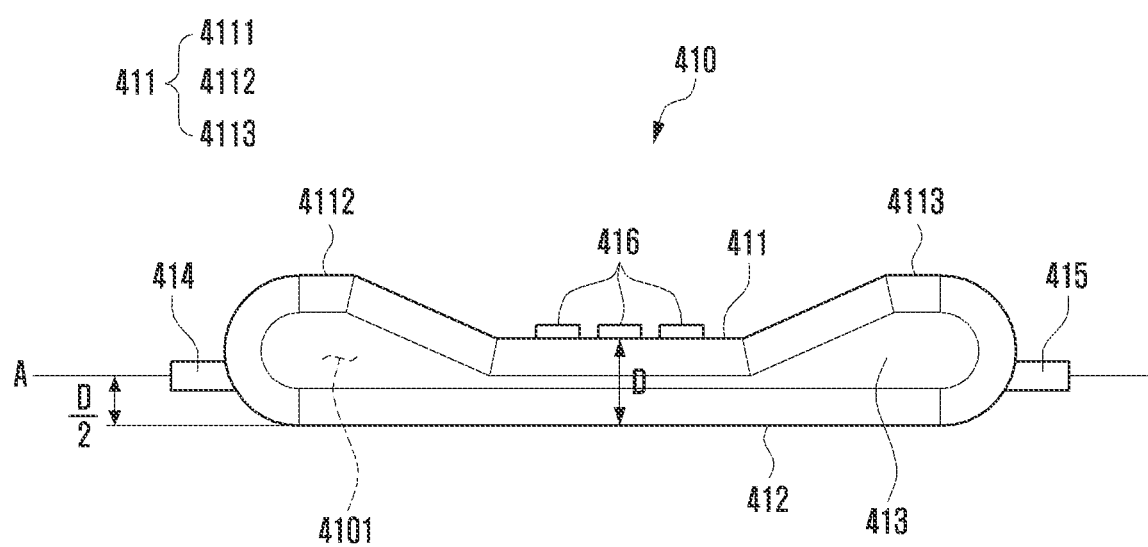
FIG. 5B is a side view of a module housing according to an embodiment of the disclosure.

FIG. 5B is a side view of a module housing according to an embodiment of the disclosure.

Referring to FIGS. 5A and 5B, the module housing 410 may include a first module surface 411, a second module surface 412 facing in the opposite direction to the first module surface 411, and a module side surface 413 surrounding the inner space 4101 between the first module surface 411 and the second module surface 412. According to one embodiment, the module housing 410 is disposed in the inner space 4101 and may include at least one camera module 416 disposed to detect the external environment through at least a part of the first module surface 411. According to one embodiment, the module housing 410 may include a first shaft 414 and a second shaft 415 protruding in opposite directions through at least a portion of the module side surface 413. According to one embodiment, when the module housing 410 is disposed on a support member (e.g., the support member 311 of FIG. 4), the module housing 410 may be rotated based on the rotation axis A formed by a first shaft 414 and a second shaft 415.

According to various embodiments, the first module surface 411 may include a mounting part 4111 in which at least one camera module 416 is disposed, a first pressing part 4112 (e.g., a first bump) which is formed higher than the mounting part 4111 at one side of the mounting part 4111, and a second pressing part 4113 (e.g., a second bump) which is formed higher than the mounting part 4111 at the other side of the mounting part 4111. According to one embodiment, the first pressing part 4112 and the second pressing part 4113 may be formed to have substantially the same height. According to an embodiment, according to the rotation of the module housing 410, the first pressing part 4112 and the second pressing part 4113 may be contacted to press the back of the stretchable display (e.g., the stretchable display 320 of FIG. 3), and the mounting part 4111 disposed therebetween may protect the at least one camera module 416 by inducing it not to come into contact with the stretchable display 320. In some embodiments, the first pressing part 4112 and the second pressing part 4113 are not distinguished, and they may be replaced by a single pressing part that surrounds at least a portion of the mounting part 4111 and is formed higher than the mounting part 4111. According to an embodiment, the first pressing part 4112 and the second pressing part 4113 may be formed into a curved surface for reducing frictional force caused by contact with the stretchable display 320 and preventing damage to the stretchable display 320. In some embodiments, the first pressing part 4112 and the second pressing part 4113 may be connected in a seamless curved shape extending to the module side surface 413.

According to various embodiments, the axis of rotation A formed by the first shaft 414 and the second shaft 415 may be set asymmetrically with respect to the first module surface 411 and the second module surface 412 (eccentric arrangement). This is due to the rotational structure of the module housing 410 that avoids contact with the stretchable display 320 in the case of the first rotation state and presses the stretchable display 320 through the first pressing part 4112 and the second pressing part 4113 only in the second rotational state. Accordingly, the rotation axis A formed by the first shaft 414 and the second shaft 415 may be set lower than the mounting part 4111. According to one embodiment, the axis of rotation A can be set at a half distance D/2 of the vertical distance D from the mounting part 4111 of the first module surface 411 to the second module surface 412. However, the disclosure is not limited thereto, and the rotation axis A may be set to a position lower than the mounting part 4111 and higher or lower than the half distance D/2.

Figure 5C:
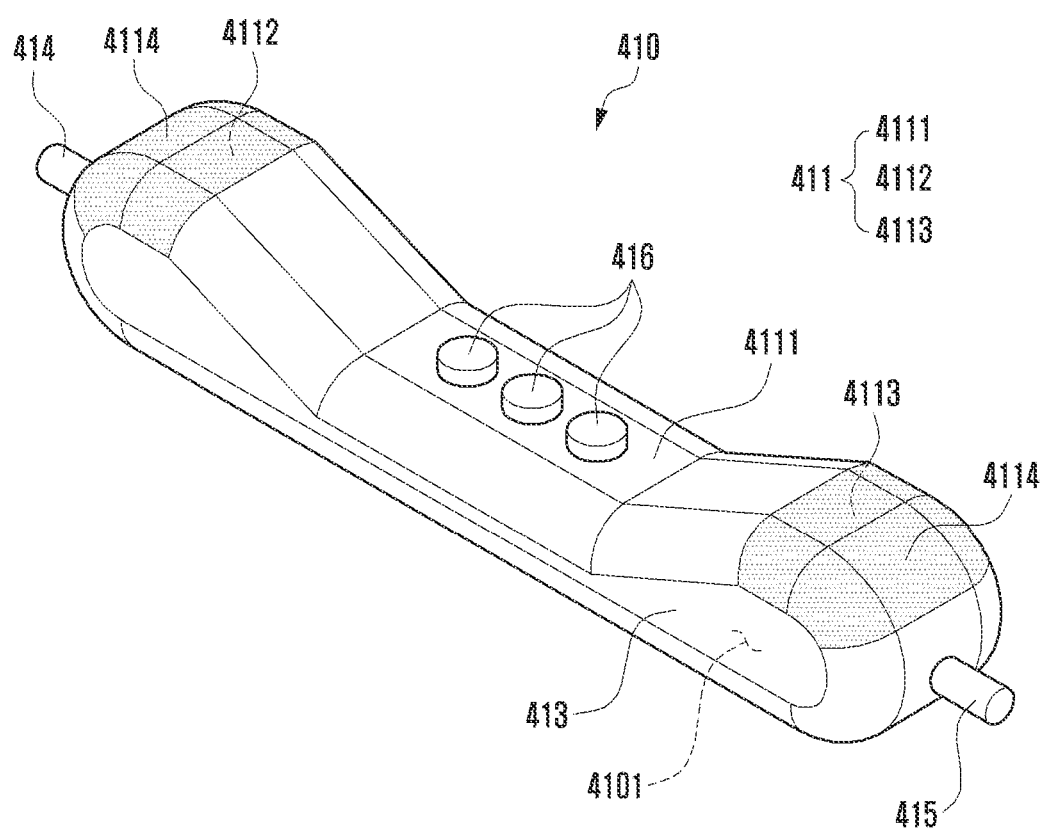
FIG. 5C is a perspective view of a module housing according to an embodiment of the disclosure.

FIG. 5C is a perspective view of a module housing 410 according to an embodiment of the disclosure.

Referring to FIG. 5C, the module housing may further include a friction reducing layer 4114 disposed on the first pressing part 4112 and the second pressing part 4113 in order to reduce frictional force caused by contact with the stretchable display 320. According to one embodiment, the friction reducing layer 4114 may include either or both a Teflon coating layer or a hard coating layer. In some embodiments, the friction reducing layer 4114 may be laminated (e.g., coated) on a corresponding area of the rear surface of the stretchable display 320 in contact with the first pressing part 4112 and the second pressing part 4113.

Figure 6A:
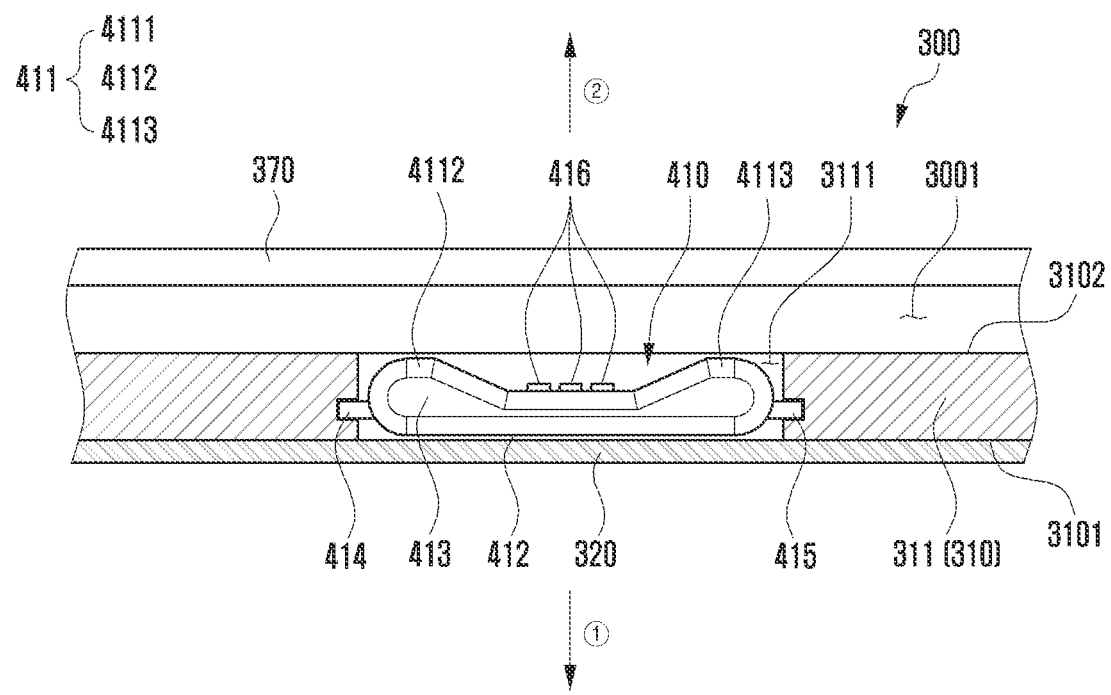
FIG. 6A is a partial cross-sectional view of an electronic device taken along line 6a-6a of FIG. 4 in a first rotational state of a module housing according to an embodiment of the disclosure.

FIG. 6A is a partial cross-sectional view of an electronic device taken along line 6a-6a of FIG. 4 in a first rotational state of the module housing according to an embodiment of the disclosure.

Figure 6B:
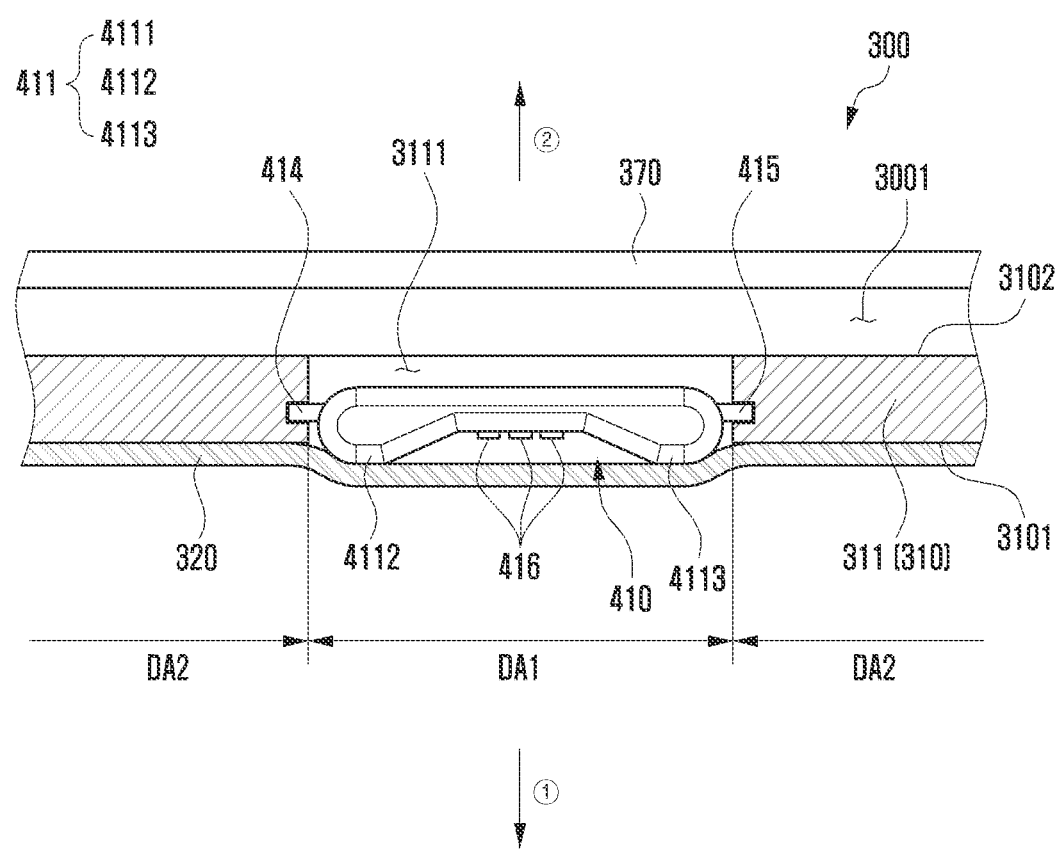
FIG. 6B is a partial cross-sectional view of an electronic device illustrating an arrangement structure of a module housing in a second rotational state according to an embodiment of the disclosure.

FIG. 6B is a partial cross-sectional view of an electronic device illustrating an arrangement structure of a module housing in a second rotational state according to an embodiment of the disclosure.

In the description of FIGS. 6A and 6B, the configuration of the driving module (e.g., the driving module 420 of FIG. 4) for rotating the module housing 410 has been omitted for convenience of description.

Referring to FIG. 6A, the electronic device 300 may include a module housing 410 that is rotatably disposed to penetrate through the opening 3111 of the support member 311, and at least one camera module 416 disposed in the inner space of the module housing 410 (e.g., the inner space 4101 of FIG. 5A). According to one embodiment, in the first rotation state, the module housing 410 may be positioned corresponding to the first direction (① direction) in which the second module surface 412 faces the stretchable display 320 (e.g., the z-axis direction in FIG. 3) and the first module surface 411 corresponding to the second direction (② direction) faces the rear cover 370 (e.g., the −z axis direction in FIG. 3). In this case, the second module surface 412 of the module housing 410 may maintain a spaced apart state from the stretchable display 320 at a specified interval. According to one embodiment, in the first rotation state of the module housing 410, at least one camera module 416 may be set to detect an external environment through the rear cover 370.

Referring to FIG. 6B, in the second rotation state, the module housing 410 may be positioned so that the second module surface 412 corresponds to the second direction (② direction) facing the rear cover 370 and the first module surface 411 faces the stretchable display 320 in the first direction (① direction). In this case, during the rotation operation of the module housing 410, the first pressing part 4112 and the second pressing part 4113 formed on the first module surface 411 of the module housing 410 are in contact with the back surface of the stretchable display 320; and, through continuous rotation of the module housing 410, they may deform the stretchable display 320 to have the extended area DA1 protruding outward from the peripheral area DA2. According to an embodiment, the deformed extended area DA1 of the stretchable display 320 may have a relatively higher transmittance than the peripheral area DA2. According to one embodiment, in the second rotation state of the module housing 410, the at least one camera module 416 may be set to detect the external environment through the extended area DA1 of the stretchable display 320.

According to various embodiments, the amount of protrusion of the first pressing part 4112 and the second pressing part 4113 may be determined according to the degree of deformation of the expansion area DA1 of the stretchable display 320 according to the rotation of the module housing 410. For example, the amount of protrusion of the extended area DA1 of the stretchable display 320 through the pressing of the first pressing part 4112 and the second pressing part 4113 may be determined according to the allowable transmittance of at least one camera module 416 disposed below it. In some embodiments, when at least one camera module 416 is arranged in a plurality, the amount of protrusion of the extended area DA1 of the stretchable display 320 may be determined by the allowable transmittance of a camera module requiring the highest transmittance among the plurality of camera modules.

Figure 7:
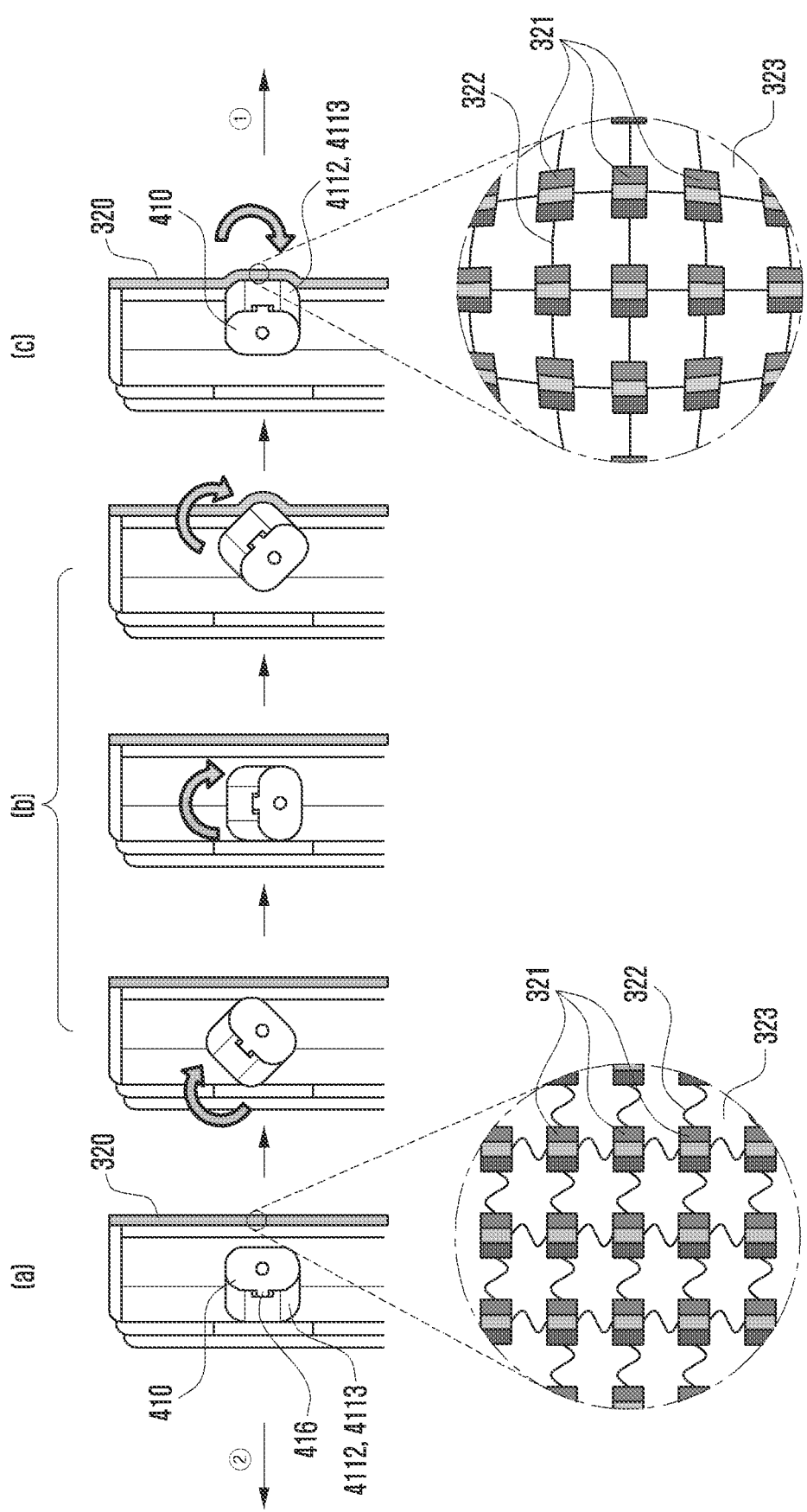
FIG. 7 is an operational diagram of a module housing for using an optical sensor according to an embodiment of the disclosure.

FIG. 7 is an operational diagram of a module housing for using an optical sensor according to an embodiment of the disclosure.

Referring to FIG. 7, a plurality of stretchable displays 320 are disposed on an elastic substrate 323 to have a specified first density, and they may include pixels 321 electrically connected to each other through expandable electrical wiring 322. In this case, the stretchable display 320 may perform an intrinsic display function without considering the surrounding camera module.

According to various embodiments, a module housing 410 disposed in the electronic device 300 may, in a first rotation state (e.g., state (a)), be positioned such that at least one camera module 416 faces in the second direction (②direction). In this case, the stretchable display 320 may be in a state that does not receive interference from the module housing 410, and the at least one camera module 416 may be set to detect an external environment exposed to the second direction (② direction) of the electronic device. According to one embodiment, even during a state in which the module housing 410 is rotated (e.g., during state (b)), the stretchable display 320 may be maintained in a state such that it is not interfered with by the module housing 410.

According to various embodiments, the module housing 410 disposed in the electronic device 300 may, in the second rotation state (e.g., state (c)), be positioned such that at least one camera module 416 faces in the first direction (① direction). In this case, the stretchable display 320 receives the pressure of the first pressing part 4112 and the second pressing part 4113 of the module housing 410, and it may include an extended area protruding from the outer surface with a certain amount of protrusion (e.g., an extended area DA1 in FIG. 6B). According to an embodiment, the stretchable display 320, in an extended area (e.g., extended area DA1 of FIG. 6B), by increasing the separation distance of each of the plurality of pixels 321 through the electric wiring 322 that is deformable according to the expansion of the elastic substrate 323, may arrange the plurality of pixels 321 to have a second arrangement density lower than the first arrangement density. In this case, transmittance in the extended area (e.g., the extended area DA1 of FIG. 6B) may be higher than the transmittance of the non-expanded peripheral area (e.g., the peripheral area DA2 of FIG. 6B). Accordingly, the at least one camera module 416 is able to detect smoothly the external environment exposed to the electronic device 3000 in the first direction (① direction) through the extended area (e.g., the extended area DA1 of FIG. 6B) of the stretchable display 320 deformed to have a relatively high transmittance.

Figure 8A:
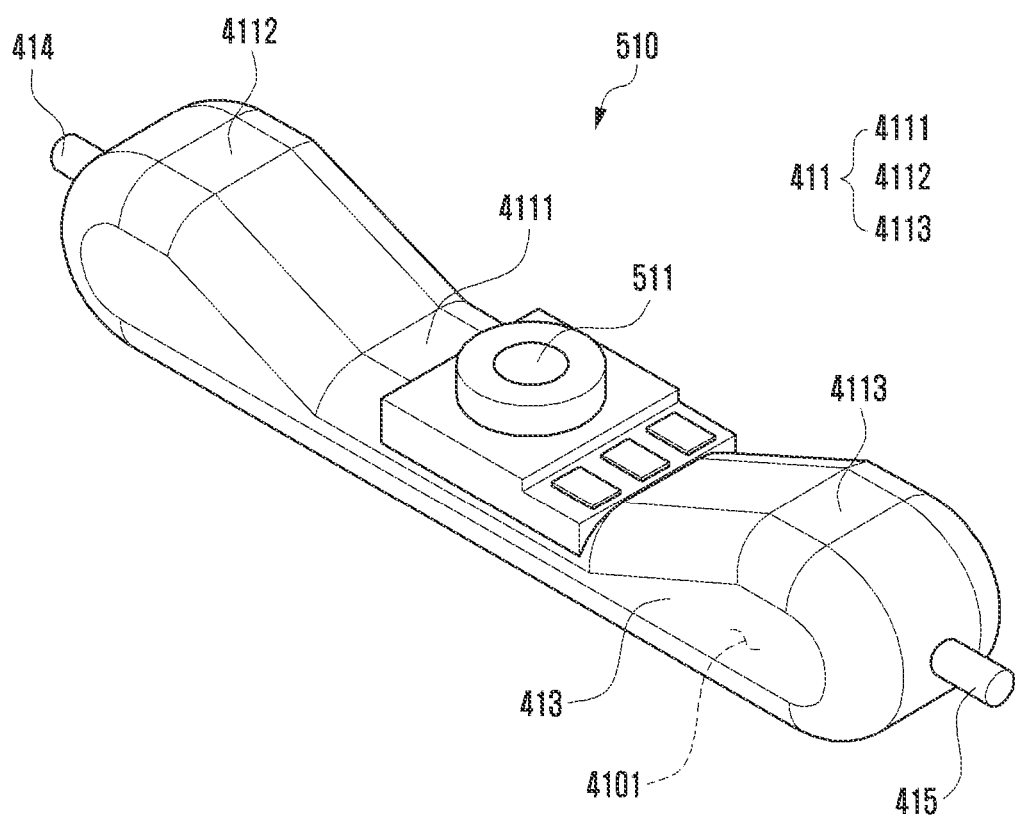
FIGS. 8A and 8B are perspective views of a module housing viewed from various directions according to various embodiments of the disclosure.
Figure 8B:
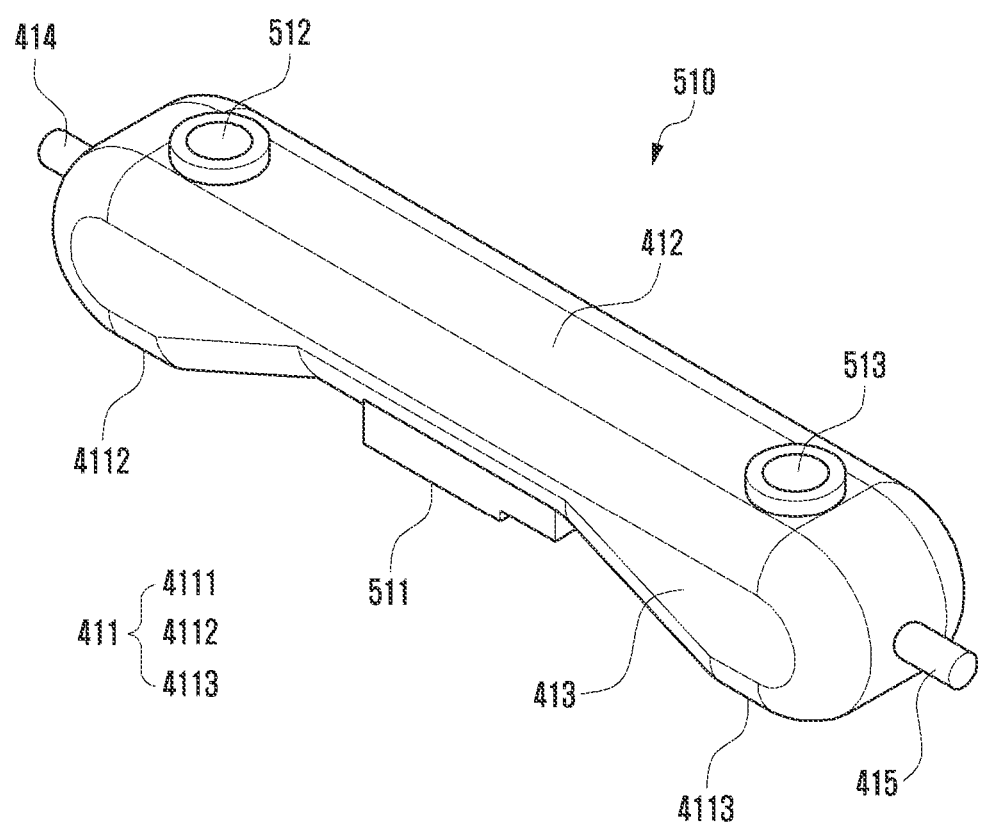

FIGS. 8A and 8B are perspective views of a module housing viewed from various directions according to various embodiments of the disclosure.

In describing the module housing 510 of FIGS. 8A and 8B, the same reference numerals are assigned to the components substantially the same as those of the module housing 410 of FIGS. 5A and 5B, and detailed descriptions thereof may be omitted.

Referring to FIGS. 8A and 8B, the module housing 410, in the inner space 4101, may include at least one camera module 511 arranged to detect the external environment through the mounting part 4111 of the first module surface 411 and at least one distance detection sensor 512, 513 arranged to detect the external environment through the second module surface 412. According to an embodiment, the at least one camera module 511 may include an OIS camera or an RGB camera. According to an embodiment, the at least one distance detection sensor 512, 513 may include either or both a time of flight (TOF) sensor (i.e., distance detection sensors 512) or an infrared sensor (i.e., distance detection sensors 513). According to an embodiment, the at least one camera module 511 and the distance detection sensors 512 and 513 may be set to operate alternately or simultaneously according to the rotation state of the module housing 410. For example, each of the at least one camera module 511 and the distance detection sensors 512 and 513, through the rotation operation of the module housing 410, may be set to detect only the external environment exposed to a first direction (e.g., the first direction in FIG. 7 (① direction)). In some embodiments, each of the at least one camera module 511 and the distance detection sensors 512 and 513, through the rotation operation of the module housing 410, may be set to detect only the external environment exposed to a second direction (e.g., the second direction in FIG. 7 (② direction)). In some embodiments, each of the at least one camera module 511 and the distance detection sensors 512 and 513, through the rotation operation of the module housing 410, may be set to detect the external environment exposed at the same time in the first direction (e.g., the first direction in FIG. 7 (① direction)) and the second direction (e.g., the second direction in FIG. 7 (② direction)), thereby helping to capture a 360-degree image.

Figure 9:
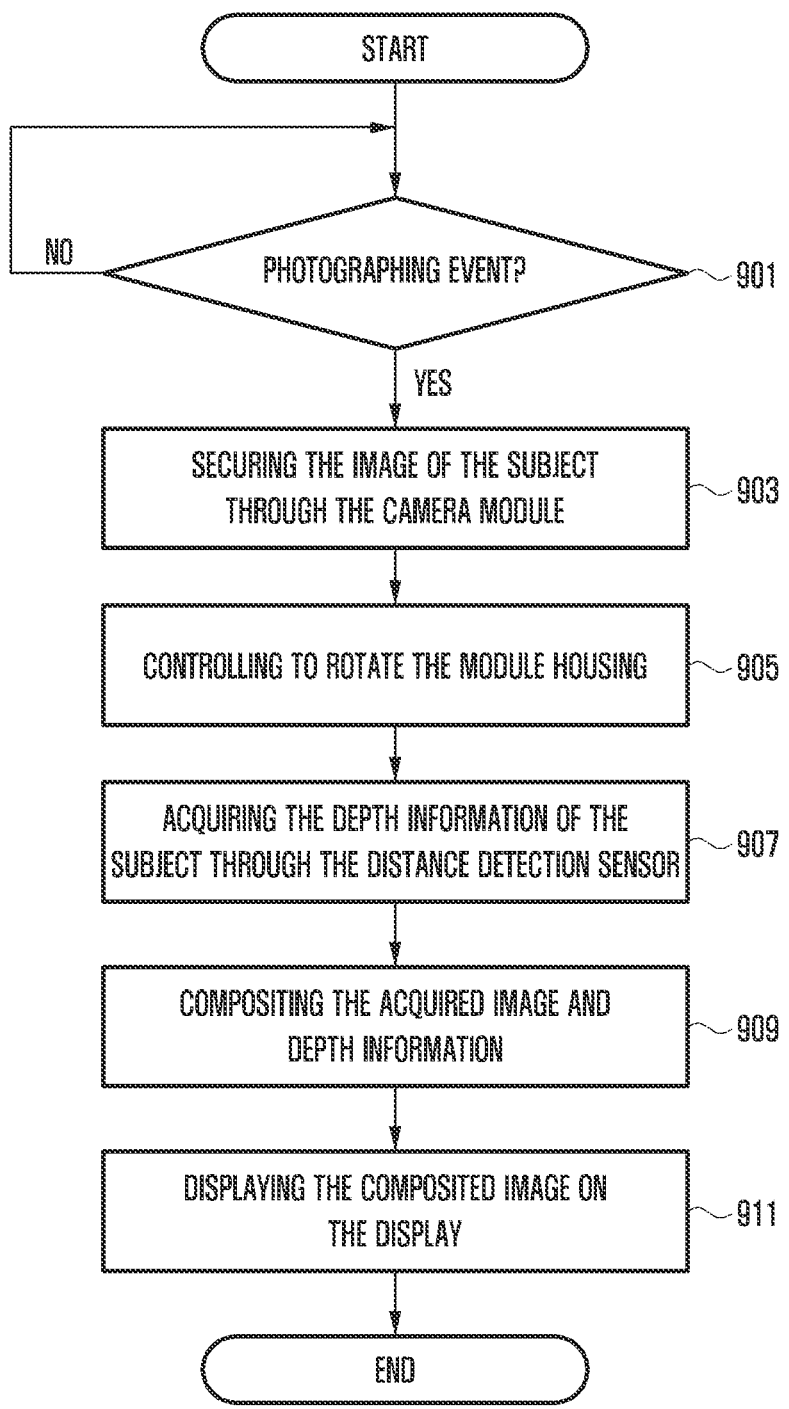
FIG. 9 is a control flowchart for using an optical sensor through a rotation operation of the module housing of FIG. 8A according to an embodiment of the disclosure.

FIG. 9 is a control flowchart for using an optical sensor through a rotation operation of the module housing of FIG. 8A according to an embodiment of the disclosure.

Figure 10A:
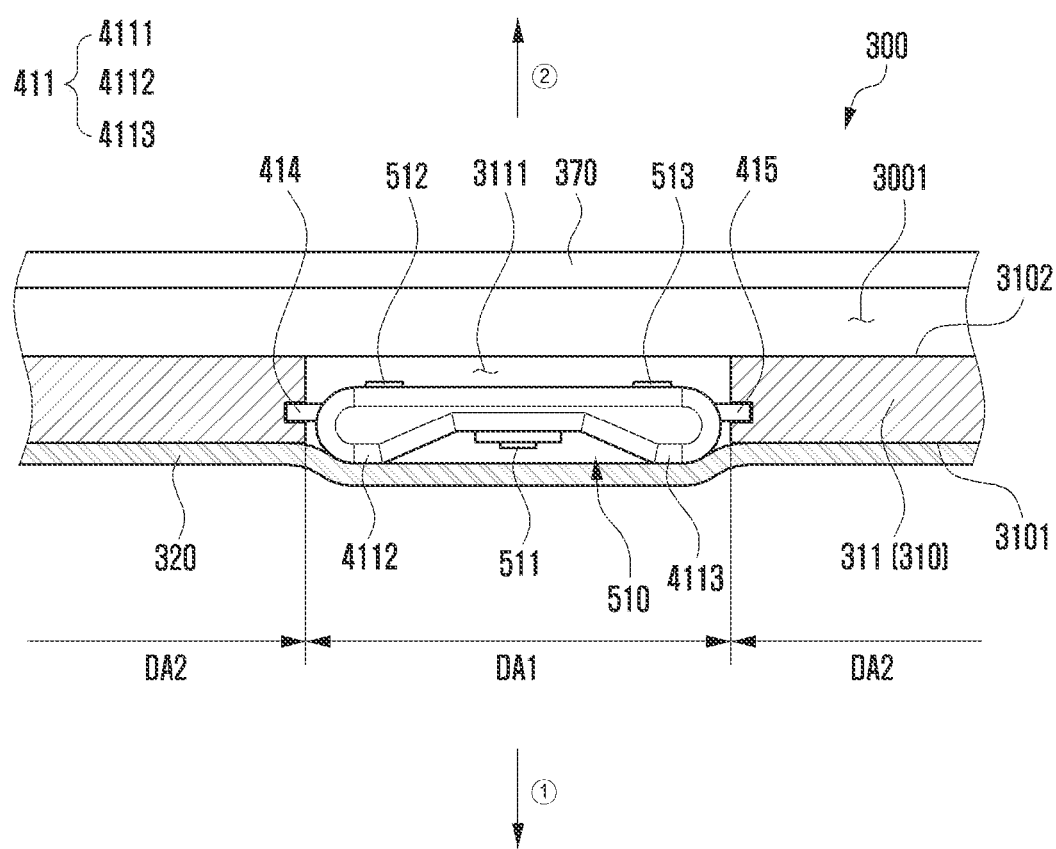
FIGS. 10A and 10B are views illustrating an operation relationship of a module housing for explaining the flowchart of FIG. 9 according to various embodiments of the disclosure.
Figure 10B:
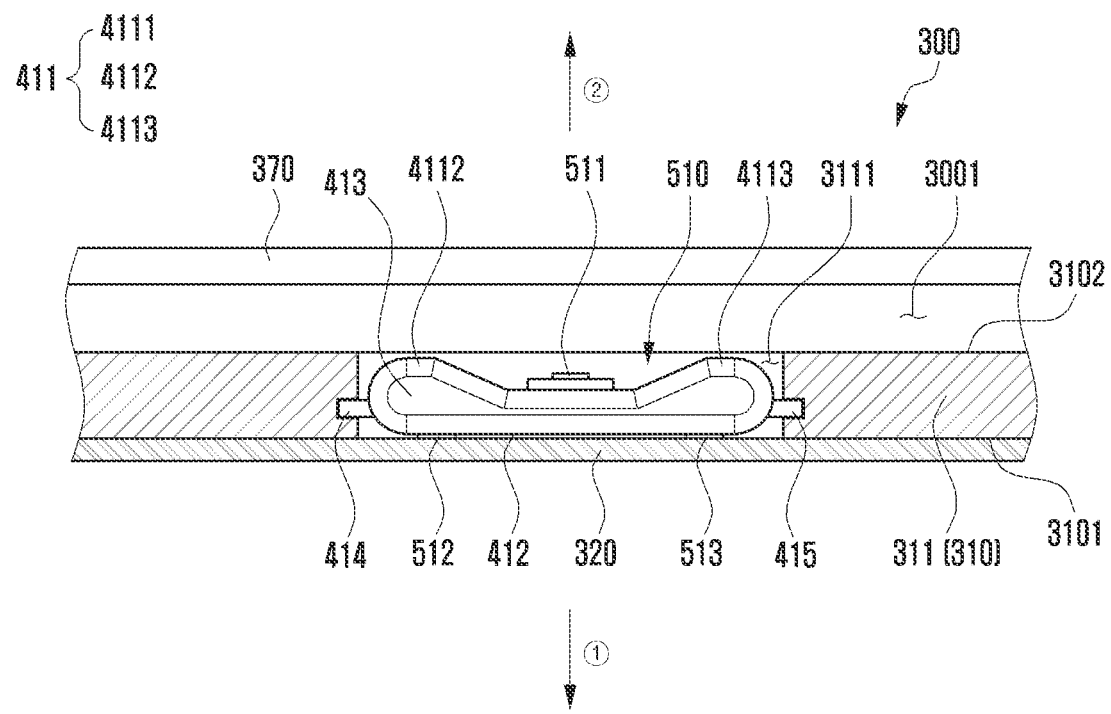

FIGS. 10A and 10B are views illustrating an operation relationship of a module housing for explaining the flowchart of FIG. 9 according to various embodiments of the disclosure.

In describing the electronic device 300 of FIGS. 10A and 10B, the same reference numerals are assigned to the components substantially the same as those of the electronic device 300 of FIGS. 6A and 6B, and the detailed description may be omitted.

Referring to FIGS. 9 to 10B, the electronic device 300 may detect, in operation 901, whether a photographing event has occurred. According to an embodiment, the electronic device 300 detects a request to start operation of the camera module received through an input device (e.g., a key button input or a touch input) or detects a photographing request through an application program.

In operation 903, upon detecting a photographing request event, the electronic device 300 may acquire an image of the subject through the camera module 511. For example, in an initial state of the electronic device 300, as shown in FIG. 10B, when the camera module 511 is disposed to face the rear cover 370, by rotating the module housing 410 through the driving module (e.g., the driving module 420 in FIG. 4), the camera module 511 may be positioned to face the first direction (① direction) and set to photograph the subject. In some embodiments, the electronic device 300 is in a deformed state by being pressed through the pressing parts 4112 and 4113 of the module housing 410, as shown in FIG. 10A; and, in an initial state, it may be set to photograph the subject exposed in the first direction (① direction) through the camera module 416 without rotating the module housing 410.

Then, in operation 905, the electronic device 300 controls the rotation operation of the module housing 410 so that the distance detection sensors 512 and 513 face the first direction (① direction); and, in operation 907, depth information of the subject may be additionally obtained through the distance detection sensors 512 and 513.

Thereafter, in operation 909, the image information obtained from the camera module 511 and the depth information obtained from the distance detection sensors 512 and 513 are synthesized; and, in operation 911, a three-dimensional image synthesized to have a sense of depth of the subject may be displayed through the stretchable display 320.

The electronic device 300 according to various embodiments of the disclosure, when the corresponding position of the housing (e.g., the housing 301 of FIG. 4) is disposed with a transparent material, through the module housing 410 rotation control, may be set to detect the external environment in a front direction (e.g., in a first rotational state) in which at least one optical sensor (e.g., the camera module 511 and the distance detection sensors 512 and 513) faces the stretchable display 320, in a rear direction opposite to the front direction (e.g., second rotation state), and in at least one other direction between the front and rear surfaces (e.g., side facing direction) (e.g., third rotation state). In some embodiments, the electronic device 300, through the rotation control of the module housing 410 when the corresponding position of the housing (e.g., the housing 301 of FIG. 4) is made of a transparent material, by setting at least one optical sensor to detect the external environment while moving from the front direction to which the stretchable display faces to the rear direction without interruption, may obtain a 360-degree three-dimensional image through image synthesis.

According to various embodiments, the electronic device (e.g., the electronic device 300 of FIG. 4) as an assembly of a housing (e.g., the housing 301 of FIG. 4), a stretchable display (e.g., the stretchable display 320 of FIG. 3) disposed to be visible from the outside to face a first direction (e.g., the z-axis direction of FIG. 3) in at least a part of the housing, and an optical sensor assembly (e.g., the optical sensor assembly 400 of FIG. 4) disposed in a first space of the housing (e.g., the inner space 3001 of FIG. 4), includes the optical sensor assembly which includes a module housing rotatably disposed in a first space and including a second space (e.g., the module housing 410 in FIG. 4A) and at least one first optical sensor (e.g., an inner space 4101 of FIG. 5A) disposed in the second space of the module housing and disposed to detect an external environment through at least a part of the module housing (e.g., at least one camera module 416 in FIG. 5A); and, in a first rotation state, the module housing is positioned such that the at least one first optical sensor detects an external environment in a second direction different from the first direction (e.g., −z-axis direction in FIG. 3); and, in a second rotational state, the module housing may be positioned to detect the external environment in a first direction through an extended area of the stretchable display (e.g., the extended area of FIG. 6B) in which the at least one first optical sensor is expanded by pressing at least a portion of the module housing DA1.

According to various embodiments, the optical sensor assembly may further include a driving motor disposed to rotate the module housing in the first space.

According to various embodiments, the extended area may protrude more than a peripheral area of the stretchable display.

According to various embodiments, the protrusion amount of the extended area of the stretchable display protruding through at least a portion of the module housing may be determined by an allowable transmittance for the at least one first optical sensor.

According to various embodiments, it may further include at least one second optical sensor disposed in the second space and disposed to detect an external environment through at least a portion of the module housing.

According to various embodiments, the at least one second optical sensor may be arranged to detect the external environment in the first direction through the stretchable display in the first rotation state.

According to various embodiments, the at least one second optical sensor may be arranged to detect the external environment in the second direction in the second rotation state.

According to various embodiments, the at least one second optical sensor may include a distance detection sensor.

According to various embodiments, the module housing includes a first module surface, a second module surface facing in the opposite direction to the first module surface, and a module side surface surrounding the second space between the first module surface and the second module surface; and, in a first rotational state, the first module surface may be positioned to face the second direction.

According to various embodiments, in the second rotation state, the first module surface may be positioned to face the first direction.

According to various embodiments, a contact surface of the first module surface in contact with the stretchable display may be formed as a curved surface.

According to various embodiments, the housing may include a side member that at least partially defines the appearance of an electronic device, a support member extending from the side member into the first space and including a first surface supporting at least a portion of the stretchable display and a second surface facing in a direction opposite to the first surface, and a cover member disposed at a position corresponding to the second surface of the support member.

According to various embodiments, in the first rotation state the at least one optical sensor may be arranged to detect an external environment through at least a portion of the cover member.

According to various embodiments, an opening formed in at least a portion of the support member may be included, and the module housing may be rotatably disposed through the opening.

According to various embodiments, the at least one first optical sensor may include at least one camera device.

According to various embodiments, the electronic device includes a housing, a stretchable display arranged to be visible from the outside at part of the housing, a rotating structure rotatably disposed in the inner space of the housing, and at least one optical sensor disposed in the inner space; and the stretchable display, in a first rotational state of the rotational structure, has an extended area deformed by pressing the rotational structure, and the at least one optical sensor may be arranged to detect an external environment through an extended area of the stretchable display.

According to various embodiments, the at least one optical sensor may be disposed near the rotating structure in the inner space.

According to various embodiments, the at least one optical sensor may be arranged to rotate together with the rotating structure.

According to various embodiments, the extended area of the stretchable display may protrude more than the peripheral area through the pressing of the rotating structure.

According to various embodiments, the protrusion amount of the extended area of the stretchable display may be determined by the allowable transmittance for the at least one optical sensor.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a housing;
a stretchable display disposed so as to be visible from the outside in at least a part of the housing to face a first direction; and
an optical sensor assembly rotatably arranged in a first space of the housing, the optical sensor assembly including:
a module housing disposed in the first space of the housing and comprising a second space; and
at least one first optical sensor disposed in the second space of the module housing and configured to detect an external environment through at least a portion of the module housing,
wherein in a first rotational state, the module housing is positioned such that the at least one first optical sensor detects an external environment in a second direction different from the first direction, and
wherein in a second rotational state, the module housing is positioned such that the at least one first optical sensor detects the external environment in the first direction through an extended area of the stretchable display, which is expanded through pressing of at least a portion of the module housing.

2. The electronic device of claim 1, wherein the optical sensor assembly further comprises a driving motor disposed to rotate the module housing in the first space.

3. The electronic device of claim 1, wherein the extended area protrudes from a peripheral area of the stretchable display.

4. The electronic device of claim 3, wherein an amount of protrusion of the extended area of the stretchable display protruding through at least a part of the module housing is determined by an allowable transmittance for the at least one first optical sensor.

5. The electronic device of claim 1, further comprising:
at least one second optical sensor disposed in the second space and disposed to detect an external environment through at least a portion of the module housing.

6. The electronic device of claim 5, wherein the at least one second optical sensor is arranged to detect the external environment in the first direction through the stretchable display in the first rotational state.

7. The electronic device of claim 5, wherein the at least one second optical sensor is arranged to detect the external environment in the second direction in the second rotational state.

8. The electronic device of claim 5, wherein the at least one second optical sensor comprises a distance detection sensor.

9. The electronic device of claim 1, the module housing comprising:
a first module surface;
a second module surface facing in the opposite direction to the first module surface; and
a module side surface surrounding the second space between the first module surface and the second module surface,
wherein in the first rotational state, the first module surface is positioned to face the second direction.

10. The electronic device of claim 9, wherein in the second rotational state, the first module surface is positioned to face the first direction.

11. The electronic device of claim 10, wherein a contact surface of the first module surface in contact with the stretchable display is formed as a curved surface.

12. The electronic device of claim 1, wherein the housing comprises:
a side member that at least partially defines an appearance of the electronic device;
a support member extending from the side member into the first space, and comprising a first surface supporting at least a portion of the stretchable display and a second surface facing in a direction opposite to the first surface; and
a cover member disposed at a position corresponding to the second surface of the support member.

13. The electronic device of claim 12, wherein, in the first rotational state, the at least one first optical sensor is arranged to detect an external environment through at least a part of the cover member.

14. The electronic device of claim 12, further comprising:
an opening formed in at least a portion of the support member,
wherein the module housing is rotatably disposed through the opening.

15. The electronic device of claim 1, wherein the at least one first optical sensor comprises at least one camera device.

16. An electronic device comprising:
a housing;
a stretchable display arranged to be visible from the outside at part of the housing;
a rotating structure rotatably disposed in an inner space of the housing; and
at least one optical sensor disposed in the inner space,
wherein the stretchable display, in a first rotational state of the rotational structure, has an extended area deformed by pressing the rotational structure, and
wherein the at least one optical sensor is arranged to detect an external environment through the extended area of the stretchable display.

17. The electronic device of claim 16, wherein the at least one optical sensor is disposed in the inner space in proximity to the rotating structure.

18. The electronic device of claim 16, wherein the at least one optical sensor is arranged to rotate together with the rotating structure.

19. The electronic device of claim 16, wherein the extended area of the stretchable display is protruded from a peripheral area by pressing the rotating structure.

20. The electronic device of claim 19, wherein an amount of protrusion of the extended area of the stretchable display is determined by an allowable transmittance for the at least one optical sensor.

* * * * *